US007139550B2

(12) United States Patent
Cuellar et al.

(10) Patent No.: US 7,139,550 B2
(45) Date of Patent: *Nov. 21, 2006

(54) METHOD AND SYSTEM FOR VERIFYING THE AUTHENTICITY OF A FIRST COMMUNICATION PARTICIPANTS IN A COMMUNICATIONS NETWORK

(75) Inventors: Jorge Cuellar, Baierbrunn (DE); Guenther Horn, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 570 days.

This patent is subject to a terminal disclaimer.

(21) Appl. No.: 10/608,188

(22) Filed: Jun. 30, 2003

(65) Prior Publication Data

US 2004/0006714 A1 Jan. 8, 2004

Related U.S. Application Data

(63) Continuation of application No. 10/009,975, filed on Mar. 18, 2002, now Pat. No. 6,980,796.

(51) Int. Cl.
*H04M 1/66* (2006.01)

(52) U.S. Cl. .................. 455/410; 455/411; 380/242; 380/270; 380/271

(58) Field of Classification Search ........ 455/410–411; 380/247, 270–271; 713/182–186; 714/4
See application file for complete search history.

(56) References Cited

U.S. PATENT DOCUMENTS

| | | | |
|---|---|---|---|
| 5,239,294 A * | 8/1993 | Flanders et al. | 340/5.74 |
| 5,282,250 A * | 1/1994 | Dent et al. | 380/247 |
| 5,572,193 A * | 11/1996 | Flanders et al. | 340/5.74 |
| 5,642,401 A | 6/1997 | Yahagi | |
| 5,689,563 A | 11/1997 | Brown et al. | |
| 5,799,084 A | 8/1998 | Gallagher et al. | |
| 5,953,652 A * | 9/1999 | Amin et al. | 455/410 |
| 5,991,623 A * | 11/1999 | Ohta et al. | 455/435.1 |
| 6,078,807 A | 6/2000 | Dunn et al. | |
| 6,091,945 A | 7/2000 | Oka | |
| 6,108,424 A * | 8/2000 | Pitiot | 380/270 |
| 6,118,993 A * | 9/2000 | Patel | 455/411 |

(Continued)

FOREIGN PATENT DOCUMENTS

DE 195 24 021 1/1997
WO WO91/01067 1/1991

OTHER PUBLICATIONS

3G TS 33.102 version 3.0.0—Draft Standard, 3rd Generation Partnership Project, Technical Specification Group Services and System Aspects, 3G Security Architecture (May 1999).

(Continued)

*Primary Examiner*—George Eng
*Assistant Examiner*—Sharad Rampuria
(74) *Attorney, Agent, or Firm*—Staas & Halsey LLP

(57) ABSTRACT

In the method and the arrangement for checking the authenticity of a first communication subscriber in a communications network, a first fault information item is formed in the first communication subscriber using a fault detection data item of the first communication subscriber and an information item relating to a random data item. In a second communication subscriber in the communications network, a second fault information item is formed using a fault detection data item of the second communication subscriber and the information relating to the random data item. The authenticity of the first communication subscriber is checked using the first fault information and the second fault information.

24 Claims, 4 Drawing Sheets

U.S. PATENT DOCUMENTS

| | | |
|---|---|---|
| 6,618,584 B1 | 9/2003 | Carneheim et al. |
| 6,665,530 B1 | 12/2003 | Broyles et al. |
| 6,741,852 B1 | 5/2004 | Mohrs |
| 6,839,553 B1 | 1/2005 | Park |
| 6,980,796 B1 * | 12/2005 | Cuellar et al. .............. 455/410 |

OTHER PUBLICATIONS

Patent Abstract of Japan—JP 04249454—Suzuki Takayuki, Sep. 4, 1992.

Patent Abstract of Germany-DE 197 18 827 A1—Mohrs, Nov. 19, 1998.

3G TS 33.102 version 3.9.0—Draft Standard, 3$^{rd}$ Generation Partnership Project, Technical Specification Group Services and System Aspects, 3G Security Architecture (Jun. 2001)(Release 1999).

3G TS 33.102 version 3.4.2—Draft Standard, 3$^{rd}$ Generation Partnership Project, Technical Specification Group Services and System Aspects, 3G Security Architecture (Sep. 2001)(Release 4).

The GSM System, Mobility and Security Management, pp. 433-498 XP-000860007.

DE 197 18 827 A1 is equivalent to U.S. Appl. No. 6,741,852 B1.

U.S. Appl. No. 5,799,084 and WO 91/01067 are referenced in the International Search Report of the corresponding PCT Application No. PCT/DE 00/001788 (attached).

* cited by examiner

METHOD AND SYSTEM FOR VERIFYING THE AUTHENTICITY OF A FIRST COMMUNICATION PARTICIPANTS IN A COMMUNICATIONS NETWORK

This application is a continuation of application Ser. No. 10/009,975, filed Mar. 18, 2002, now U.S. Pat. No. 6,980, 796.

CROSS REFERENCE TO RELATED APPLICATIONS

This application is based on and hereby claims priority to German Application No. 19927 271.9 filed on Jun. 15, 1999 in Germany, and PCT Application No. PCT/DE00/01788 filed on May 31, 2000, the contents of which are hereby incorporated by reference.

BACKGROUND OF THE INVENTION

The invention relates to a method and an arrangement for checking the authenticity of a first communication subscriber in a communications network.

In a communications network, data is generally transmitted between communication subscribers, for example a service provider and a service user. In order to protect a communications network against penetration of an unauthorized communication subscriber into the communications network, the authenticity of each communication subscriber is generally checked.

3G TS 33.102 Version 3.0.0 Draft Standard, $3^{rd}$ Generation Partnership Project, Technical Specification Group Services and System Aspects, 3G Security, Security Architecture, 05/1999 ("the 3G reference") discloses a method and an arrangement for checking the authenticity of a communication subscriber, in particular of a service provider or of a service user in a communications network.

The method known from the 3G reference and the corresponding arrangement are based on what is referred to as 3G TS 33.102 Version 3.0.0 Draft Standard, which describes a security architecture of a mobile phone system.

In FIG. 4, the procedure during the checking of the authenticity of a communication subcriber, such as is known from the 3G reference is illustrated symbolically and parts thereof will be explained below briefly.

A transmission of data is illustrated in FIG. 4 by an arrow in each case. A direction of an arrow characterizes a transmission direction during a data transmission.

FIG. 4 shows a mobile phone system 400, comprising a user 401 of a communication service, for example a mobile phone, and a provider 402 of a communication service. The provider 402 comprises a dial-in network 403 with a dial-in network operator from which the user 401 locally requests a communication service, and a home network 404 with a home network operator with which the user 401 is signed on and registered.

In addition, the user 401, the dial-in network 403 and the home network 404 each have a central processing unit with a memory, for example a server (central computing unit), with which processing unit the procedure described below is monitored and controlled and on which memory data is stored.

The dial-in network 403 and the home network 404 are connected to one another via a data line over which digital data can be transmitted. The user 401 and the dial-in network 403 are connected to one another via any desired transmission medium for the transmission of digital data.

During a communication, the user 401 dials 410 into the dial-in network 403. At the start of the communication, checking of both the authenticity of the user 401 and the authenticity of the provider 402 is carried out.

To do this, the dial-in network 403 requests 411 what is referred to as authentication data from the home network 404, with which data the authenticity of the user 401 and of the provider 402 can be checked.

The authentication data which is obtained from the home network 404 comprises a random number and a sequential number of the provider 402. The sequential number of the provider 402 is obtained in such a way that a counter of the provider 402 increases the sequential number of the provider 402 by the value 1 at each attempt at communication between the user 401 and the provider 402.

It is to be noted that the random number and the sequential number of the provider 402 only constitute part of the authentication data and are not to be understood as comprehensive. Further authentication data is known from the 3G reference.

The home network 404 transmits 412 the requested authentication data to the dial-in network 403. The dial-in network 403 processes the received authentication data in a suitable way 413, and transmits the processed authentication data to the user 401.

The user 401 checks 415 the authenticity of the provider 402 using a dedicated sequential number, which is handled in a way corresponding to the sequential number of the provider 402, and using the sequential number of the provider 402.

The procedure during the checking of the authenticity of the provider 402 is described in the 3G reference.

A result of the checking of the authenticity of provider 402, "authenticity of provider satisfactory" 416, "authenticity of provider satisfactory but sequential fault has occurred" 417 or "authenticity of provider not satisfactory" 418, is transmitted 419 from the user 401 to the provider 402.

In the case of the result "authenticity of provider satisfactory" 416, the dial-in network 403 checks 420 the authenticity of the user 401 as described in the 3G reference.

In the case of the result "authenticity of provider not satisfactory" 418, the communication is interrupted and/or restarted 421.

In the case of the result "authenticity of provider satisfactory but a sequential fault has occurred" 417, resynchronization takes place in such a way that the home network 404 transmits 422 a resynchronization request to the user 401. The user responds with a resynchronization response in which resynchronization data is transmitted 423 to the home network 404. The sequential number of the provider 402 is changed 424 as a function of the resynchronization response. The authenticity of the user 401 is then checked, as is known from the 3G reference.

The procedure described has the disadvantage that during checking of the authenticity of a communication subscriber, in particular during the checking of the authenticity of a service provider, a large amount of data has to be transmitted between the communication subscribers.

SUMMARY OF THE INVENTION

One aspect of the invention is thus based on simplifying and improving the known method and the known arrangement, to yield a simplified and improved arrangement for checking the authenticity of a communication subscriber in a communications network.

In the method for checking the authenticity of a first communication subscriber in a communications network, a first fault information item is formed in the first communication subscriber using a fault detection data item of the first communication subscriber and an information item relating to a random data item. In a second communication subscriber in the communications network, a second fault information item is formed using a fault detection data item of the first communication subscriber and the information relating to the random data item.

The authenticity of the first communication subscriber is checked using the first fault information item and the second fault information item.

In the arrangement for checking the authenticity of a first communication subscriber in a communications network, the first communication subscriber is set up in such a way that a first fault information item can be formed using a fault detection data item of the first communication subscriber and an information item relating to a random data item. In addition, the arrangement has a second communication subscriber in the communications network which is set up in such a way that a second fault information item can be formed using a fault detection data item of the second communication subscriber and the information relating to the random data item. The authenticity of the first communication subscriber can be checked using the first fault information item and the second fault information item.

The checking of the authenticity of a communication subscriber in a communications network is to be understood as meaning method steps which are carried out in the wider sense with checking of the authorization of a communication subscriber for access to a communications network or participation in communication in a communications network.

This thus encompasses both method steps which are carried out within the scope of the checking of the authorization of a communication subscriber for access to a communications network and such method steps which are carried out within the scope of the processing or the administration of data which is used in the checking.

The developments described below relate to the method and to the arrangement.

The development described below can be implemented either using software or hardware, for example using a specific electrical circuit.

In one refinement, the first communication subscriber is a service provider and/or the second communication subscriber is a service user in the communications network.

A sequential number is preferably used as the fault detection data item.

In one refinement, the information relating to the random data item is a random number.

In one development, the checking of the authenticity is simplified by determining a difference between the fault detection data item of the first communication subscriber and the fault detection data item of the second communication subscriber.

In one refinement, the checking of the authenticity is further improved with respect to the security of the communications network by limiting the difference.

One development is preferably used within the scope of a mobile phone system. In the mobile phone system, the service user is implemented as a mobile phone and/or the service provider is implemented as a mobile phone network operator.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
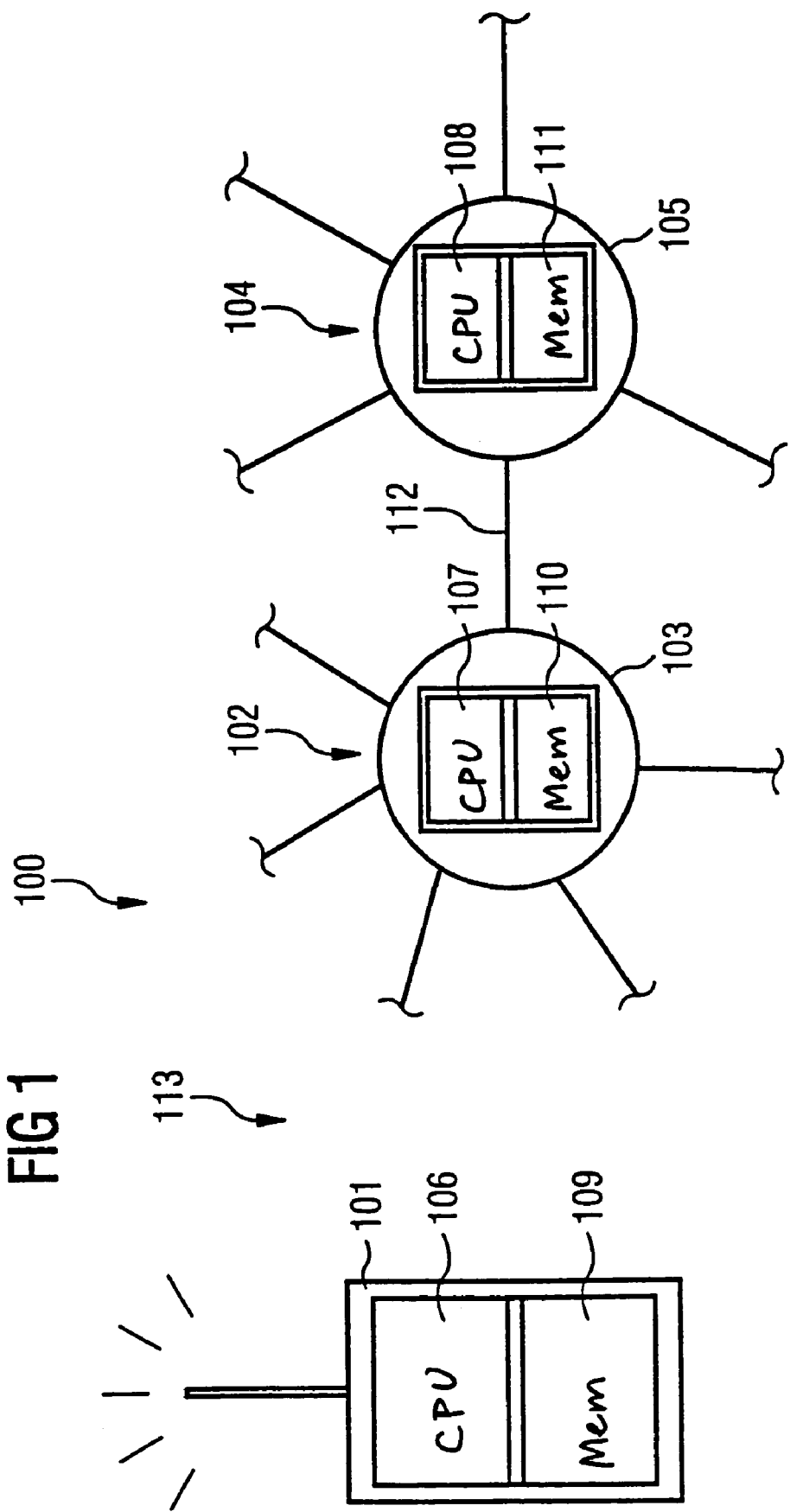
FIG. 1 shows a mobile phone system.

Reference will now be made in detail to the preferred embodiments of the present invention, examples of which are illustrated in the accompanying drawings, wherein like reference numerals refer to like elements throughout.

Exemplary Embodiment: Mobile Phone System

A mobile phone system 100 is illustrated in FIG. 1. The mobile phone system 100 comprises a mobile phone 101, a local dial-in network 102 with a dial-in network operator 103 and a home network 104 with a home network operator 105.

The mobile phone 101 is signed on and registered in the home network 104.

In addition, the mobile phone 101, the dial-in network 102 and the home network 104 each have a central processing unit 106, 107, 108 with a memory 109, 110, 111, with which processing units 106, 107, 108 the procedure described below is monitored and controlled, and on which memories 109, 110, 111 data is stored.

The dial-in network 102 and the home network 104 are connected to one another via a data line 112 via which digital data can be transmitted. The mobile phone 101 and the dial-in network 102 are connected to one another via any desired transmission medium 113 for transmitting digital data.

The procedure during the checking of the authenticity of the mobile phone 101 and the procedure during the checking of the authenticity of the home network 104 and/or of the home network operator 105 are illustrated symbolically in FIG. 2, and parts thereof will be explained below briefly.

Figure 2:
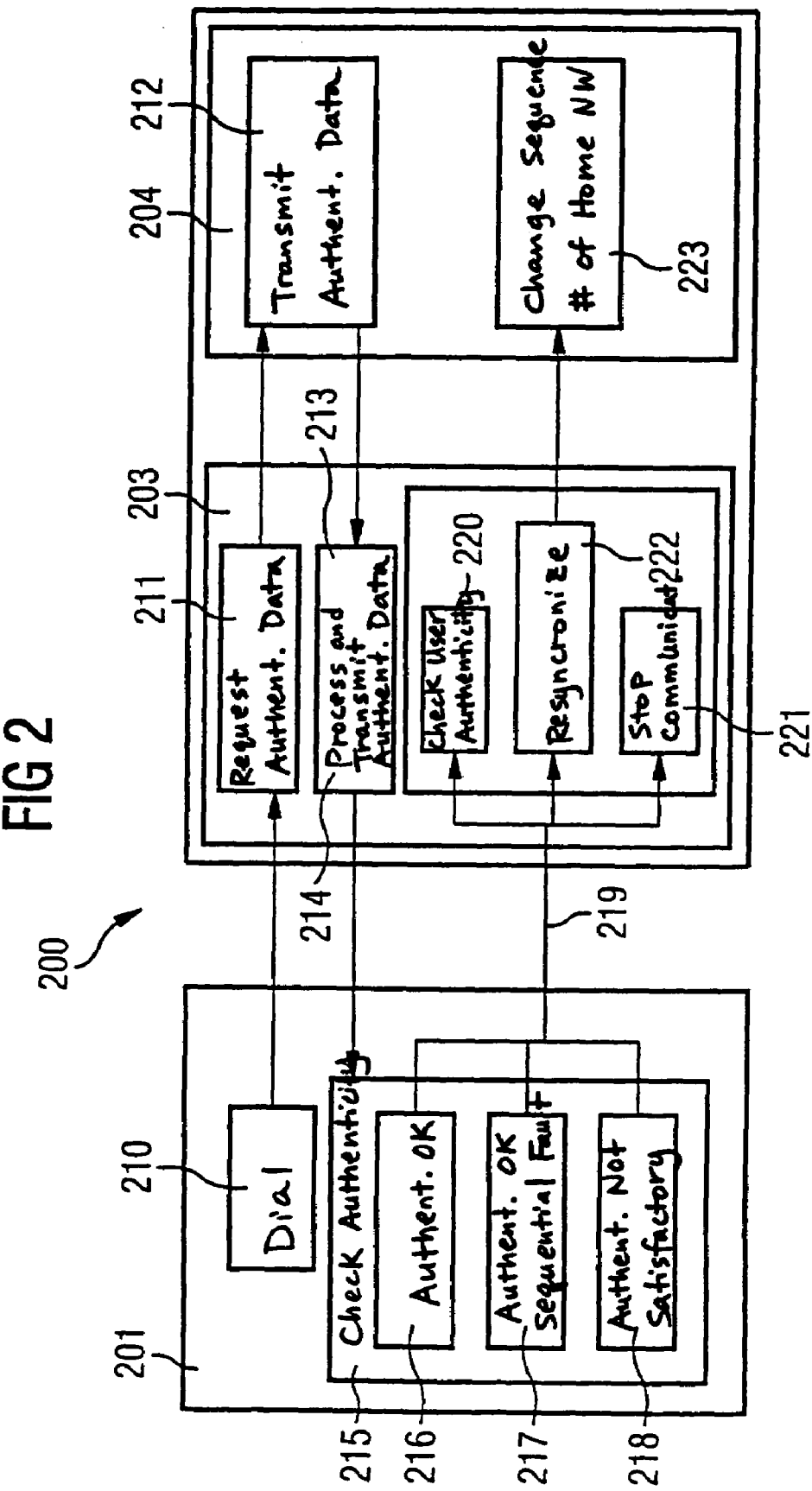
FIG. 2 shows an outline in which checking of the authenticity of a communication subscriber is illustrated symbolically.

The transmission of data in FIG. 2 is illustrated in each case by an arrow. A direction of an arrow characterizes a transmission direction during a data transmission.

The procedure which is described below and illustrated symbolically in FIG. 2 is based on what is referred to as a 3G TS 33.102 Version 3.0.0 Standard, which describes a security architecture of a mobile phone system and is described in the 3G reference.

During a communication, the mobile phone 201 dials 210 into the dial-in network 203. At the start of the communication, checking both of the authenticity of the mobile phone 201 and of the authenticity of the home network 204 and/or of the home network operator takes place.

To do this, the dial-in network 203 requests 211 authentication data from the home network 204, with which authentication data the authenticity of the user 201 and of the home network 204 and/or of the home network operator can be checked.

Figure 3:
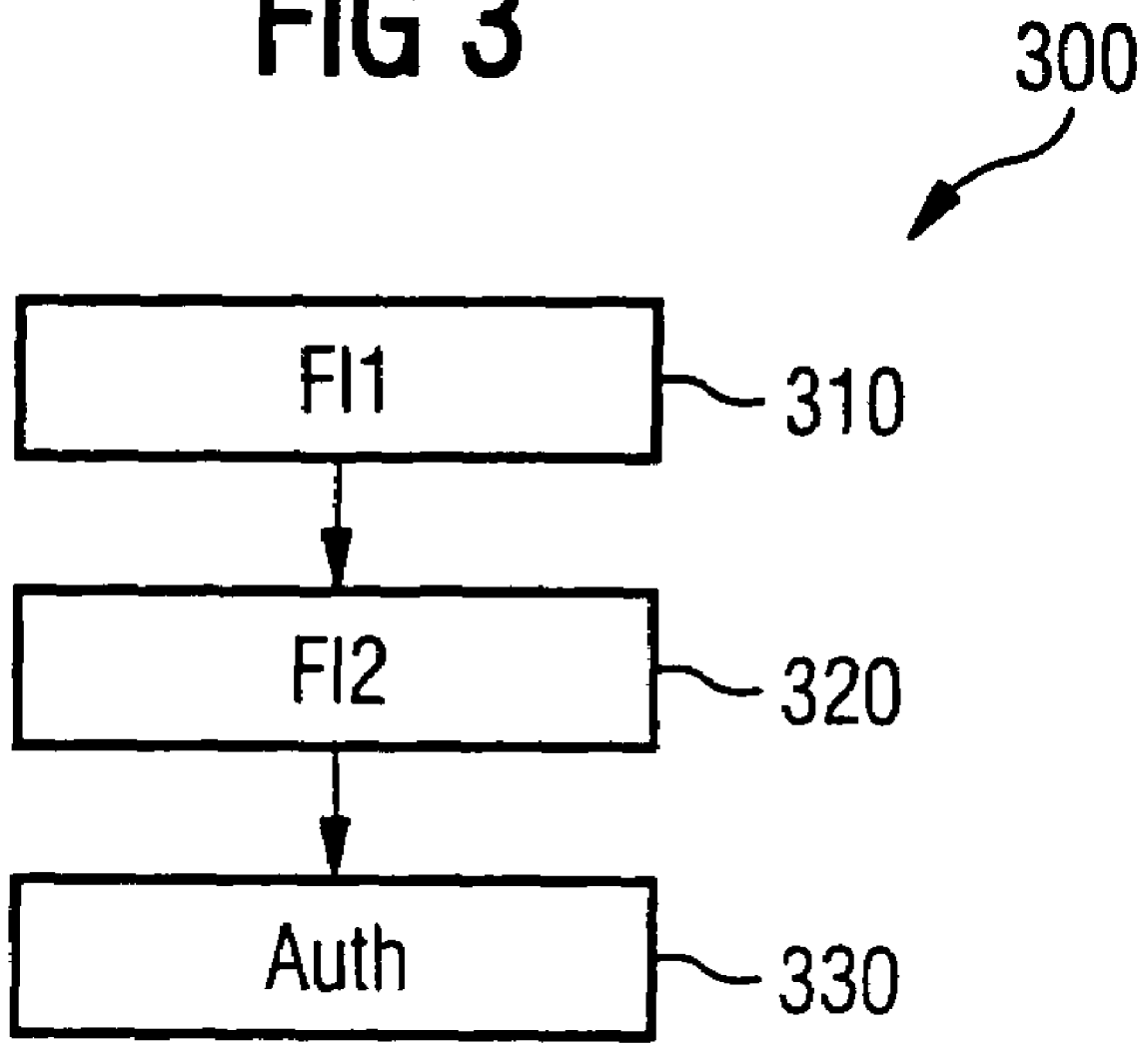
FIG. 3 shows a flowchart in which individual method steps are illustrated during checking of the authenticity of a service provider in a communications network.
Figure 4:
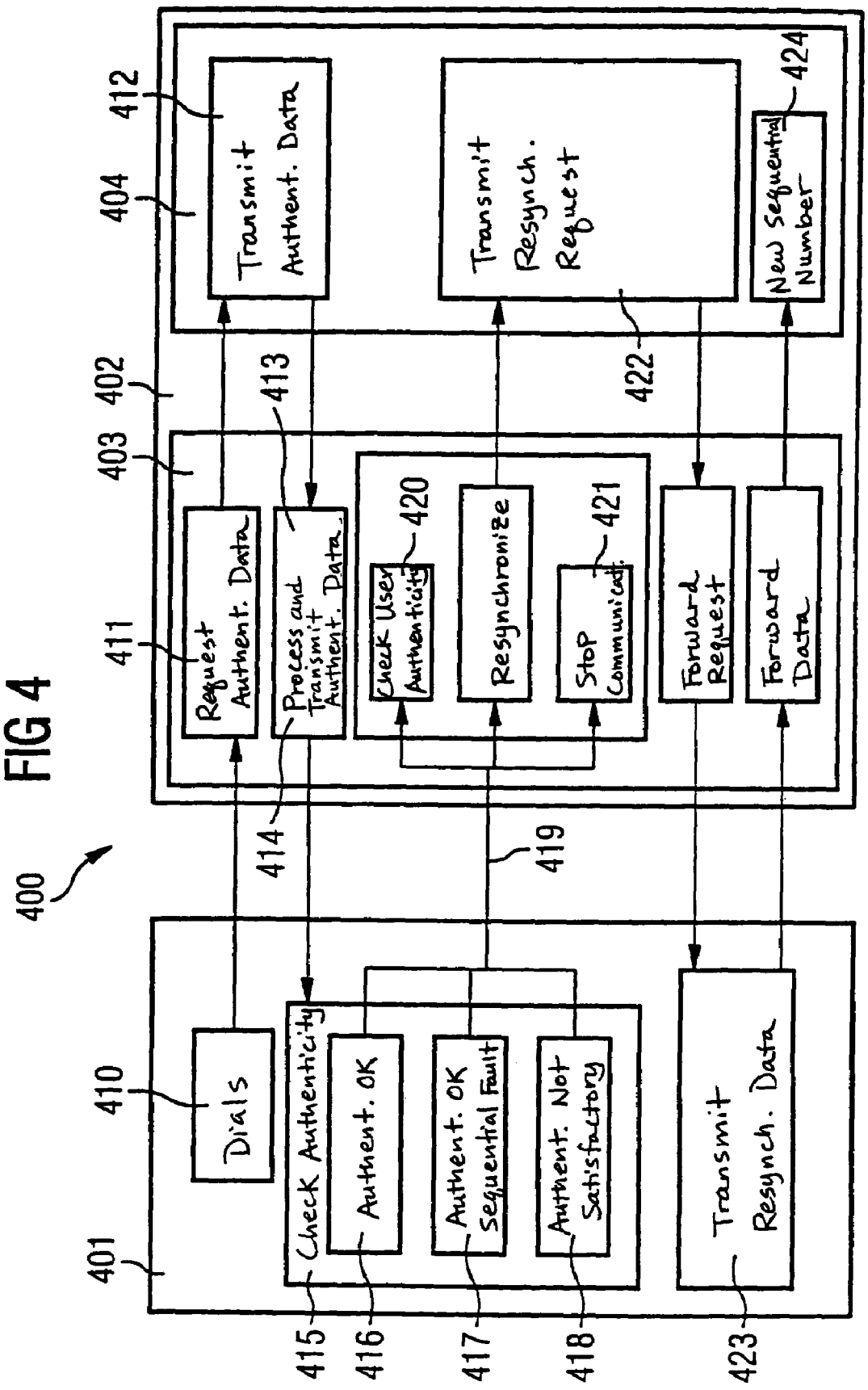
FIG. 4 shows an outline in which checking of the authenticity of a communication subscriber in accordance with the 3G TS 33.102 Version 3.0.0 Standard is illustrated symbolically.

The authentication data which is determined by the home network 204 comprises a random number and a sequential number of the home network 204 (cf. FIG. 3 step 310). The sequential number of the home network 204 is determined in such a way that a counter of the home network 204 increases the sequential number of the home network 204 by the value 1 at each attempt at communication between the mobile phone 201 and the home network 204.

It is to be noted that the random number and the sequential number of the home network 204 only constitute part of the authentication data and are not to be understood as comprehensive. Further authentication data is specified in the 3G reference.

The home network 204 transmits 212 the requested authentication data to the dial-in network 203. The dial-in network 203 processes the received authentication data in a suitable way 213 and transmits the processed authentication data to the mobile phone 201.

The mobile phone 201 checks 215 the authenticity of the home network 204 using a dedicated sequential number which is handled in a way corresponding to the sequential number of the home network 204, and using the sequential number of the home network 204. In a way corresponding to the home network 204, the mobile phone 201 also has a counter.

The procedure during the checking of the authenticity of the home network 204 is described in the 3G reference. Method steps which differ therefrom are described below.

What is referred to as overflow checking of the counter of the mobile phone 201 is carried out within the scope of the checking of the authenticity of the home network 203. This overflow checking prevents overflowing of an acceptable numerical range of the counter of the mobile phone 201.

In the overflow checking, the following conditions are tested:
1) sequential number of the home network 204>sequential number of the mobile phone 201;
2) sequential number of the home network 204—sequential number of the mobile phone 201<—predefinable deviation (1,000,000);
the following applying for the predefined deviation:
predefinable deviation is sufficiently large in order to ensure, during normal or fault-free communications operation:
that the sequential number of the home network 204—sequential number of the mobile phone 201 is not>predefinable deviation;
the maximum permissable sequential number of the mobile phone 201/predefinable deviation is sufficiently large in order to ensure that the maximum permissible sequential number of the mobile phone 201 is not reached during operation.

The result of the checking of the authenticity of the home network 204, "authenticity satisfactory" 216, "authenticity satisfactory but a sequential fault has occurred" 217 or "authenticity not satisfactory" 218 is transmitted 219 to the home network 204 from the mobile phone 201.

In the case of the result "authenticity satisfactory" 216, the dial-in network 203 checks 220 the authenticity of the mobile phone 201, as described in 3G reference.

In the case of the result "authenticity not satisfactory" 218, the communication is interrupted or restarted 221.

In the case of the result "authenticity satisfactory but a sequential fault has occurred" 217, resynchronization 222 takes place. Resynchronization is to be understood as a change of the sequential number of the home network 204.

For this purpose, the mobile phone 201 transmits 222 resynchronization data to the dial-in network 203.

The resynchronization data comprises the same random number which was transmitted within the scope of the authentication data, and the sequential number of the mobile phone 201 (cf. FIG. 3 step 320).

The dial-in network 203 processes the resynchronization data in a suitable way and transmits the processed resynchronization data to the home network 204.

The home network 204 checks the sequential number of the mobile phone 201 and the sequential number of the home network 204 using the processed resynchronization data, and if appropriate changes 223 the sequential number of the home network 204 (cf. FIG. 3 step 330).

The home network 204 subsequently transmits new authentication data, which if appropriate comprises the changed sequential number of the home network 204, to the dial-in network 203.

In order to illustrate the described procedure, important steps 300 of the procedure are illustrated in FIG. 3.

FIG. 3 shows a first step 310 within the scope of which the authentication data (first fault information) is determined.

The resynchronization data (second fault information) is determined within the scope of a second step 320.

The sequential number of the mobile phone and the sequential number of the home network are checked within the scope of a third step 330, using the resynchronization data.

An alternative of the first exemplary embodiment is described below.

In the alternative exemplary embodiment, a method is implemented in which the home network is made more reliable with respect to a data loss in the event of a system crash.

For this purpose, the current sequential number of the home network is stored in the memory of the home network, in each case at a predefinable time interval. A sequential number of the home network which has been lost during a system crash of the home network is restored in such a way that a predefinable additional value is added to the value of the stored sequential number. The predefinable additional value is dimensioned in such a way that exceeding of the sum of the sequential number of the mobile phone and the predefinable deviation is not exceeded.

In the alternative exemplary embodiment, the predefinable additional value is determined in such a way that an average number of authentication attempts on one day by the home network, which number is determined during operation of the communications network, is multiplied by a factor with the value 10.

The invention has been described in detail with particular reference to preferred embodiments thereof and examples, but it will be understood that variations and modifications can be effected within the spirit and scope of the invention.

What is claimed is:

1. A method of checking authenticity of a first communication subscriber in a communication network having first and second communication subscribers, comprising:
    forming a first error detection datum at the first communication subscriber;
    transmitting an information item concerning a random datum from the first communication subscriber to the second communication subscriber;
    forming a second error detection datum of the second communication subscriber;

forming an error information item at the second communication subscriber, using the second error detection datum and the information item concerning the random datum;

transmitting the error information item from the second communication subscriber to the first communication subscriber; and checking the first and second error detection data at the first communication subscriber using the error information item.

2. The method according to claim 1, further comprising:
forming authentication data using the first error detection datum and the information item concerning the random datum; and
transmitting the authentication data from the first communication subscriber to the second communication subscriber.

3. The method according to claim 1, further comprising:
reproducing the first error detection datum at the second communication subscriber; and
checking authenticity of the first communication subscriber at the second communication subscriber based on whether the first error detection datum reproduced by the second communication subscriber lies in a predetermined range.

4. The method according to claim 3, wherein checking the authenticity comprises:
determining a difference between the first error detection datum formed by the first communication subscriber and the first error detection datum reproduced by the second communication subscriber; and
forming a sequence error, when the difference does not lie in the predetermined range.

5. The method according to claim 4, wherein
the sequence error contains the information item concerning the random datum and the second error detection datum, and
the sequence error is transmitted from the second communication subscriber to the first communication subscriber.

6. The method according to claim 5, wherein
the sequence error is verified at the first communication subscriber, and
a value of the first error detection datum is changed at the first communication subscriber in dependence on a value of the second error detection datum.

7. The method according to claim 6, wherein
the method further comprises determining authentication data using the information item concerning the random datum and the first error detection datum, as changed at the first communication subscriber, and
the authentication data is matched to the information item concerning the random datum.

8. The method according to claim 1, second error detection data is a sequential number.

9. The method according to claim 1, wherein the information item concerning the random datum is a random number.

10. The method according to claim 1, wherein the first communication subscriber is a service provider and/or the second communication subscriber is a service user in the communication network.

11. The method according to claim 9, wherein the service provider is a mobile radio operator of a mobile radio system and/or the service user is a mobile telephone.

12. The method according to claim 1, further comprising changing a valve of the first error detection datum to resynchronize the first and the second error detection data.

13. The method according to claim 2, further comprising:
reproducing the first error detection datum at the second communication subscriber; and
checking authenticity of the first communication subscriber at the second communication subscriber based on whether the first error detection datum reproduced by the second communication subscriber lies in a predetermined range.

14. The method according to claim 13, wherein checking the authenticity comprises:
determining a difference between the first error detection datum formed by the first communication subscriber and the first error detection datum reproduced by the second communication subscriber; and
forming a sequence error, when the difference does not lie in the predetermined range.

15. The method according to claim 14, wherein
the sequence error contains the information item concerning the random datum and the second error detection datum, and
the sequence error is transmitted from the second communication subscriber to the first communication subscriber.

16. The method according to claim 15, wherein
the sequence error is verified at the first communication subscriber, and
a value of the first error detection datum is changed at the first communication subscriber in dependence on a value of the second error detection datum.

17. The method according to claim 16, wherein
the method further comprises determining authentication data using the information item concerning the random datum and the first error detection datum, as changed at the first communication subscriber, and
the authentication data is matched to the information concerning the random datum.

18. The method according to claim 17, wherein the first and second error detection data are sequential numbers.

19. The method according to claim 18, wherein the information item concerning the random datum is a random number.

20. The method according to claim 19, wherein the first communication subscriber is a service provider and the second communication subscriber is a service user in the communication network.

21. The method according to claim 20, wherein the service provider is a mobile radio operator of a mobile radio system and the service user is a mobile telephone.

22. The method according to claim 21, further comprising changing a valve of the first error detection datum to resynchronize the first and the second error detection data.

23. A system to check authenticity in a communication network, comprising:
a first communication subscriber to form a first error detection datum, and to transmit an information item concerning a random datum;
a second communication subscriber to receive the information item concerning a random datum from the first communication subscriber, to form a second error detection datum of the second communication subscriber, to form an error information item using the information item concerning the random datum and the second error detection datum and to transmit the error information item to the first communication subscriber, for the first communication subscriber to check the second error detection datum and the first error detection datum using the error information item.

24. A system for checking authenticity in a communication network having first and second communication subscribers, comprising:

means for forming a first error detection datum for the first communication subscriber;

means for transmitting an information item concerning a random datum, from the first communication subscriber to the second communication subscriber;

means for forming a second error detection datum for the second communication subscriber;

means for forming an error information item using the information item concerning the random datum and the second error detection datum;

means for transmitting the error information item from the second communication subscriber to the first communication subscriber; and means for checking the first and second error detection data at the first communication subscriber, using the error information item.

* * * * *